United States Patent [19]
Tarbutton et al.

[11] Patent Number: 4,846,905
[45] Date of Patent: Jul. 11, 1989

[54] ACID CATALYZED, TOUGHENED EPOXY ADHESIVES

[75] Inventors: Kent S. Tarbutton; Janis Robins, both of St. Paul, Minn.

[73] Assignee: Minnesota Mining and Manufacturing Company, St. Paul, Minn.

[21] Appl. No.: 178,148

[22] Filed: Apr. 6, 1988

[51] Int. Cl.$^4$ .............................................. C08L 63/02
[52] U.S. Cl. ...................................... 525/65; 525/119; 525/122; 528/92; 528/110
[58] Field of Search ......................... 525/65, 119, 122; 528/92, 110

[56] References Cited

U.S. PATENT DOCUMENTS

| | | | |
|---|---|---|---|
| 3,496,250 | 2/1970 | Czerwinski | 260/836 |
| 4,503,211 | 3/1985 | Robins | 528/92 |
| 4,524,181 | 6/1985 | Adam et al. | 525/107 |
| 4,553,982 | 11/1985 | Korbel et al. | 51/298 |
| 4,668,736 | 5/1987 | Robins et al. | 525/65 |
| 4,775,734 | 10/1988 | Goel | 528/92 X |

*Primary Examiner*—Earl Nielsen
*Attorney, Agent, or Firm*—Donald M. Sell; Walter N. Kirn; James V. Lilly

[57] ABSTRACT

Disclosed is a thermally-curable, one-part epoxy adhesive composition comprising: (1) a glycidyl ether epoxide having a048477475 n epoxy functionality grater than one and a molecular weight between about 150 and 10,000; (2) a catalyst comprising (i) an acid of the formula $H^+SbF_5X^-$ wherein X is halogen, hydroxy, or —OR where —OR is the residue of an aliphatic or aromatic alcohol having a molecular weight less than about 10,000 and (ii) N,N-diethyl-o-toluidine; (3) an aliphatic or non-aromatic cyclic polyol having about 2 to 18 carbon atoms, at least two hydroxy groups of which are primary or secondary, and being free of electron-withdrawing substituents, amine substituents, or large substituents that cause steric hindrance in the α-position in relation to the carbon attached to the methylol group of the polyol; and (4) a toughening agent that does not react with the epoxide during curing and has an epoxide compatible component and an epoxide incompatible component.

22 Claims, No Drawings

ACID CATALYZED, TOUGHENED EPOXY ADHESIVES

FIELD OF THE INVENTION

This invention relates to latently curable, one-part epoxy adhesives. In particular, it relates to such adhesives that are acid catalyzed.

DESCRIPTION OF THE PRIOR ART

Epoxides, i.e., organic compounds having one or more terminal or pendant oxirane (epoxy) groups, have been widely used for many years in adhesive compositions. These compounds are commonly cured, or caused to harden, by the addition of a curing or hardening agent.

Many epoxy adhesive compositions use curing agents that begin to react immediately, or after a short period of time, even at room temperature or lower temperatures. These two-part adhesive compositions require that the epoxide and the curing agent be stored separately and only mixed immediately before use. Various attempts have been made to prolong cure time or "pot life" of curable epoxy compositions. This allows the epoxide and curing agent to be mixed and stored before use as a one-part adhesive that is curable upon heating. Generally, it has been found that increase in pot life of epoxy composition results in a corresponding sacrifice of cure time and/or physical characteristics of the resulting cured adhesive.

U.S. Pat. No. 4,503,211 (Robins) and U.S. Pat. No. 4,553,982 (Korbel et al.) disclose latent elevated temperature curable epoxy adhesives, which contain an epoxide, and as a curing agent, a liquid salt mixture of a substituted pentafluoroantimonic acid and an aromatic amine. Korbel further discloses a coated abrasive product employing liquid epoxy resin and the curing agent. These adhesive compositions exhibit good pot life while permitting rapid cure at elevated temperatures. However, these adhesives do not exhibit good T-peel strengths and impact resistance when used as an adhesive for metals, such as anodized aluminum, or galvanized steel.

An objective of the instant invention is to provide a one-part epoxy adhesive composition having good pot life and rapid cure at elevated curing temperature, while providing in the bonded product a good balance of overlap shear strength, peel strength, and impact strength along with improved durability.

SUMMARY OF THE INVENTION

Accordingly, the instant invention is a composition comprising (a) a glycidyl ether epoxide having an epoxy functionality greater than one and a molecular weight between about 150 and 10,000, (b) a catalyst comprising a mixture of a compound of the formula H+SbF$_5$X− wherein X is halogen, hydroxy, or —OR wherein —OR is the residue of an aliphatic or aromatic alcohol, and N,N-diethyl-o-toluidine, (c) an aliphatic or non-aromatic cyclic polyol having 2 to 18 carbon atoms, at least two hydroxy groups of which are primary or secondary, and being free of electron-withdrawing substituents, amine substituents, and large substituents that cause steric hindrance in the α-position in relation to the carbon attached to the methylol group of the polyol, and (d) a non-reactive toughening agent having an epoxide compatible component and an epoxide incompatible component insoluble in the epoxide.

The composition of the instant invention is useful as a curable adhesive, in coatings, and in molded, cast, and potted products. As an adhesive, the composition provides excellent durability when bonding metals such as galvanized steel and aluminum.

The instant invention also provides a method for using the composition of the instant invention to bond metals such as galvanized steel and aluminum either to themselves or to each other.

In the present application the term "pot life" or "pot stability" means the time taken for a composition to increase two-fold in viscosity. The term "latent" or "latently curable" means an appreciable delay in the cure time or a relatively long pot life or pot stability, preferably 5 days or more.

DETAILED DESCRIPTION

The epoxide useful in the composition of the instant invention is a glycidyl ether epoxide having more than one oxirane ring polymerizable by ring opening, i.e., an epoxy functionality greater than one, preferably at least 2. These useful epoxides have a molecular weight between about 150 and 10,000, preferably, between about 300 and 1,000. Included are linear polymeric epoxides having terminal epoxy groups (e.g., a diglycidyl ether of a polyoxyalkylene glycol), polymeric epoxides having skeletal epoxy groups (e.g., polybutadiene polyepoxy), and polymeric epoxides having pendent epoxy groups (e.g., a glycidyl methacrylate polymer or copolymer). Mixtures of the useful epoxides are also useful in the composition of the instant invention.

The useful epoxides are well-known and include such epoxides as the diglycidyl ethers of bisphenol A and of novolak resins, such as described in "Handbook of Epoxy Resins" by Lee and Nevill, McGraw-Hill Book Co., New York (1967). Useful epoxies are also disclosed in the heretofore mentioned U.S. Pat. No. 4,503,211 issued to Robins, the disclosure of which is incorporated herein by reference.

Useful epoxides in the composition of the instant invention include compounds having the required molecular weight of the formula

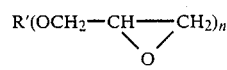

wherein R' is alkyl, preferably aryl, and n is an integer between 2 and 6. Preferred are aromatic glycidyl ethers, such as those prepared by reacting a polyhydric phenol with an excess of epichlorohydrin. Examples of useful polyhydric phenols include resorcinol, catechol, hydroquinone, phloroglucinol and the polynuclear phenols including p,p-dihydroxydibenzyl, p,p-dihydroxydiphenyl, p,p'-dihydroxyphenyl sulfone, p,p'-dihydroxybenzophenone, 2,2'-dihydroxy-1,1-dinaphthylmethane, and the 2,2'; 2,3'; 2,4'; 3,3'; 3,4'; and 4,4'isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylphenylmethane, dihydroxydiphenylbutylphenylmethane, dihydroxydiphenyltolylmethane, dihydroxydiphenyltolylmethylmethane, dihydroxydiphenyldicyclohexylmethane, dihydroxydiphenylcyclohexane, and polyhydric phenolic formaldehyde condensation products. Also preferred are polyglycidyl polyethers that contain as reactive groups only epoxy groups and hydroxy groups. Compounds of the above formula wherein n=1 are useful as optional additives in the composition of the instant invention.

Examples of commercially available epoxies that are useful in the invention include diglycidyl ethers of bisphenol A (e.g., those available under the trademarks Epon 562, Epon 828, Epon 1001, and Epon 1310 from Shell Chemical Co., and DER-331, DER-332, DER-334 available from Dow Chemical Co.), diglycidyl ethers of bisphenol F (e.g., Epiclon TM 830 available from Dainippon Ink and Chemicals, Inc.), silicon resins containing diglycidyl epoxy functionality, flame retardant epoxy resins (e.g., DER TM -580, a brominated bisphenol type epoxy resin available from Dow Chemical Co.), and 1,4-butanediol diglycidyl ethers (e.g., Kopoxite TM available from Koppers Company, Inc.). Preferably the epoxide is the diglycidyl ether of bisphenol A or bisphenol F. Most preferably the epoxide is the diglycidyl ether of bisphenol A.

The catalyst of the present invention comprises a liquid salt of a substituted pentafluoroantimonic acid and N,N-diethyl-o-toluidine. The mole ratio of substituted pentafluoroantimonic acid to the aromatic amine is in the range of 1.0:1.5 to 1:10, preferably 1:2 to 1:6.

The substituted pentafluoroantimonic acid has the formula $H^+SbF_5X^-$ wherein X is halogen, hydroxy, or —OR. In the foregoing formula, "OR" is the residue of an aliphatic or aromatic alcohol having a molecular weight less than about 10,000 and a primary or secondary hydroxy functionality of at least 1, preferably at least 2. The most preferred alcohol is diethylene glycol, which makes the "OR" group 2-(2-hydroxyethoxy)ethoxy. Examples of such catalysts are disclosed in U.S. Pat. No. 4,503,211 issued to Robins, referred to hereinabove. The amount of catalyst useful in the composition of the instant invention varies between about 0.1% and 5.0%, preferably between about 1.0% and 3.0%, based on the weight of epoxide used.

The polyols useful in the present invention are aliphatic or non-aromatic cyclic polyols having 2 to 18 carbon atoms and at least two hydroxy groups, preferably at least three hydroxy groups, with at least one hydroxy group, preferably at least two hydroxy groups, being primary. The polyol is free of amide groups, electron-withdrawing substituents such as strong acids, and large groups that cause steric hindrance in the α-position in relation to the carbon attached to the methylol group of the polyol. The polyol aids in chain lengthening and preventing over cross-linking of the epoxide during curing.

Examples of useful polyols include alkylene glycols, such as 1,2-ethanediol, 1,3-propanediol, 1,4-butanediol, and 2-ethyl-1,6-hexanediol, polyhydroxyalkanes, such as glycerine, trimethylolethane, pentaerythritol, 1,3-butanediol, 2-ethyl-1,3-pentanediol, and 2,2-oxydiethanol, and sorbitol. Other examples of useful polyols are disclosed in the heretofore mentioned U.S. Pat. No. 4,503,211, issued to Robins. Examples of preferred polyols include trimethylolethane, trimethylolpropane, trimethylolaminoethane, ethylene glycol, diethylene glycol, 2-butene-1,4-diol, pentaerythritol, dipentaerythritol, and tripentaerythritol. The polyol is present in an amount sufficient to provide a hydroxy to epoxy ratio in the composition between about 0.5:1 and 1:1, more preferably between about 0.7:1 and 0.8:1.

The polymeric toughening agents of the instant invention have an epoxide incompatible component and an epoxide compatible component and do not react with the epoxide during curing.

The toughening agents which are useful in the present invention are polymeric compounds having both a rubbery phase and a thermoplastic phase such as: graft polymers having a polymerized, diene, rubbery core and a polyacrylate, polymethacrylate shell; graft polymers having a rubbery, polyacrylate core with a polyacrylate or polymethacrylate shell; and elastomeric particles polymerized in situ in the epoxide from free radical polymerizable monomers and a copolymerizable polymeric stabilizer.

Examples of useful toughening agents of the first type include graft copolymers having a polymerized, diene, rubbery backbone or core to which is grafted a shell of an acrylic acid ester or methacrylic acid ester, monovinyl aromatic hydrocarbon, or a mixture thereof, such as disclosed in U.S. Pat. No. 3,496,250, issued to Czerwinski, incorporated herein by reference. Preferable rubbery backbones comprise polymerized butadiene or a polymerized mixture of butadiene and styrene. Preferable shells comprising polymerized methacrylic acid esters are lower alkyl ($C_1$–$C_4$) substituted methacrylates. Preferable monovinyl aromatic hydrocarbons are styrene, alphamethylstyrene, vinyltoluene, vinylxylene, ethylvinylbenzene, isopropylstyrene, chlorostyrene, dichlorostyrene, and ethylchlorostyrene. It is important that the graft copolymer contain no functional groups, such as nitriles, that would poison the catalyst. Representative examples of commercially available useful toughening agents of this type are Paraloid TM BTA 731, and BTA III N2 available from Rohm and Haas Co., and Metablen TM C-223, available from M&T Chemicals Co.

Examples of useful toughening agents of the second type are acrylate core-shell graft copolymers wherein the core or backbone is a polyacrylate polymer having a glass transition temperature below about 0° C., such as polybutyl acrylate or polyisooctyl acrylate to which is grafted a polymethacrylate polymer (shell) having a glass transition above about 25° C., such as polymethylmethacrylate. Commercially available useful toughening agents of this type include Acryloid TM KM 323 and KM 330, available from Rohm and Haas Co.

The third class of toughening agents useful in the invention comprises elastomeric particles that have a glass transition temperature ($T_g$) below about 25° C. and have been polymerized in situ in the epoxide before mixing with the other components of the composition. These elastomeric particles are polymerized from free radical polymerizable monomers and a copolymerizable polymeric stabilizer that is soluble in the epoxide. The free radical polymerizable monomers are ethylenically unsaturated monomers or diisocyanates combined with coreactive difunctional hydrogen compounds such as diols, diamines, and alkanolamines. Examples of these elastomeric particles are disclosed in U.S. Pat. No. 4,524,181 issued to Adam et al., incorporated herein by reference. These particles are commonly referred to as "organosols."

The toughening agent is useful in an amount equal to about 3–35%, preferably about 5–15%, based on the weight of the epoxide. The toughening agents of the instant invention add strength to the composition after curing without reacting with the epoxide or interfering with curing.

Various adjuvants can also be added to the composition of the instant invention to improve the characteristics of the composition after curing. Included among useful adjuvants are cationically polymerizable ethylenically unsaturated monomers having up to 12 carbon atoms, e.g., aliphatic olefins such as butadiene, cycloolefins such as dipentene(limonene), and aromatic olefins such as styrene; plasticizers such as conventional phosphates and phthalates; thixotropic agents, such as fumed silica; pigments to enhance color tones, such as ferric oxide, brick dust, carbon black, and titanium dioxide; fillers, such as talcs, silica, magnesium and calcium sulfate, beryllium aluminum silicate, clays such as bentonite, glass and ceramic beads and bubbles; and reinforcing materials, such as woven and nonwoven webs of organic and inorganic fibers, such as polyester, polyimide, glass fibers and ceramic fibers. Amounts up to about 1 part of adjuvant per part epoxide, by weight, can be used.

Reaction conditions for curing the composition of the instant invention depend on the reactants and amounts used and can be determined by those skilled in the art. Generally, the composition is heated to a temperature between about 77°–177° C., preferably between about 93°–121° C., for a time of about 3–120 minutes, preferably about 30–60 minutes.

The composition of the instant invention is particularly useful as a curable adhesive for metal-to-metal bonding. In particular, the composition is useful in the structural bonding of automobile external body parts. Improved environmental durability is observed in adhesive bonds derived from the composition, especially in bonds between anodized aluminum parts as well as galvanized steel parts.

The composition of the invention preferably has a pot life, i.e., length of time in which viscosity doubles, of at least 3 days, more preferably at least 30 days, most preferably more than 60 days at 22° C., and at least 12 hours, more preferably about 3 days, most preferably at least 5 days at 49° C. The selection of the polyol and the ratio of amine to pentafluoroantimonic acid affects the pot life of the composition. Generally, pot life increases as the ratio of amine to acid increases and as the percentage of polyol increases.

Preferably, the reactivity of the composition is such that the time for the exotherm to peak when tested using a differential scanning calorimeter (DSC) held at 137° C. is less than about 10 minutes, more preferably less than about 5 minutes, most preferably less than about 2 minutes.

EXAMPLES

The following non-limiting examples illustrate the instant invention. All parts and percentages are by weight unless indicated otherwise.

For the peel test, samples are prepared using 2024T3 clad aluminum substrate (available from ALCOA), 0.8 mm thick, FPL (Forest Products Laboratories) etched (immersion in a sulfuric acid/chromic acid bath) and anodized with phosphoric acid. Bondline thickness is about 0.25 mm.

To determine lap shear strength using galvanized steel, electrocoated galvanized steel coupons are prepared by wiping 0.8 mm thick, 25.4 mm wide, 76.2 mm long test pieces with oil (type KA-45M, available from H. A. Montgomery Co.) using a saturated cheesecloth. After 10 minutes, excess oil is removed by wiping twice with a clean cheesecloth.

To determine lap shear strength using aluminum, 2024T3 clad aluminum substrates prepared as discussed above with reference to the peel test are employed.

Adhesive is applied over an end portion of one of the desired coupons. Two 2.5 cm lengths of 0.25 mm piano wire are placed across the adhesive about 8 mm apart. An end portion (1.25 cm) of a second test coupon is placed over the adhesive to form a 1.25 cm overlap. The test coupons are clamped at each edge of the overlap using 0.94 cm capacity binder clips No. 10020 available from IDL Mfg. and Sales Corp., Carlstadt, N.J. The coupons remain so clamped until the adhesive is cured, either in a forced air oven at 163° C. for 30 minutes or by electromagnetic induction heating using a Lepel Type T-2.5-1 KC-B-W Model T-254-62 generator, available from Lepel Corp., with a 4-turn box coil (6.25 cm sq. × 3.@25 cm deep) of 0.47 cm diameter copper tubing for a specified period.

Lap shear strength is determined using ASTM Test Method D 1002-72 initially (after cooling), after immersion in boiling water for up to 4 days followed by air drying for 12 hours, and at 82° C. by equilibrating the coupons for 10 minutes at 82° C. and testing the coupons while in the constant temperature chamber. The testing apparatus is an Instron tensile testor and crosshead speed is 0.25 cm per minute.

Impact strength is determined on adhered coupons stored at a predetermined temperature (e.g., −30° C. or −56° C.) for at least 20 hours and tested immediately after removal from storage. The adhered coupons are supported horizontally about 8 mm from each end and subjected to impact to a 1680 g steel wedge, 6.35 cm in height and having a rounded (6.35 mm radius) nose hardened to Rockwell C-50 to C-60 suspended from a fulcrum by a 1.1 cm diameter, 47.6 cm long rod, the rod being permitted to swing down from the horizontal to the vertical through 90 degrees, and the nose of the wedge impacting the sample as the vertical position is reached.

Peel strength is determined using ASTM Test Method D 1876-72 initially (after cooling) at 22° C. on an Instron using a crosshead speed of 50 cm per minute. The pot life of the adhesive compositions (the length of time during which viscosity of the composition doubles) is determined at 49° C.

The reactivity of the composition is determined for the time to peak exotherm when a 10 mg sample is held at 137° C. in a differential scanning calorimeter (DSC).

EXAMPLES 1–5

Adhesive compositions are prepared using the following formulations in Table 1.

TABLE 1

| | Ex. 1 | Ex. 2 | Ex. 3 | Ex. 4 | Ex. 5 |
|---|---|---|---|---|---|
| Diglycidyl ether of bisphenol A (DEBA)[1] | 33.8 | 25.4 | 16.9 | — | — |
| Diglycidyl ether of bisphenol A[2] | — | — | — | 33.8 | 25.4 |
| Diglycidyl ether of bisphenol F (DEBF)[3] | 16.9 | 25.3 | 33.8 | 16.9 | 25.3 |
| Toughening agent[4] | 7.5 | 7.5 | 7.5 | 7.5 | 7.5 |
| 1,4-Cyclohexane-dimethanol (CHDM) | 9.7 | 9.7 | 9.7 | 9.7 | 9.7 |
| Fumed silica[5] | 3.0 | 3.0 | 3.0 | 3.0 | 3.0 |
| Clay filler[6] | 25.0 | 25.0 | 25.0 | 25.0 | 25.0 |
| N,N—diethyl-o-toluidine (DEoT) | 3.1 | 3.1 | 3.1 | 3.1 | 3.1 |
| Antimony pentafluoride (SbF$_5$) | 1.025 | 1.025 | 1.025 | 1.025 | 1.025 |
| Diethylene | 1.025 | 1.025 | 1.025 | 1.025 | 1.025 |

TABLE 1-continued

|  | Ex. 1 | Ex. 2 | Ex. 3 | Ex. 4 | Ex. 5 |
|---|---|---|---|---|---|
| glycol (DEG) | | | | | |

[1] Epoxide - uncured glycidyl ether of bisphenol A having an epoxy equivalent weight of about 190 and an average molecular weight of 350-400, available from Shell Chemical Company under the trademark Epon 828.
[2] Epoxide - virtually pure liquid bisphenol A/diglycidyl ether resin having an epoxy equivalent weight of 172-176, available from Dow Chemical Company under the trademark DER 332.
[3] Epoxide - liquid undiluted epichlorohydrin-bisphenol F epoxy resin having an epoxide equivalent weight of 170-190 and a viscosity of 3,000-4,500 cps. at 23° C. using a Cannon-Fenske viscometer, reverse flow type, available from DIC Americas, Inc. under the trademark Epiclon 830.
[4] Methyl methacrylate/butadiene/styrene copolymer available from Rohm and Haas Co. under the trademark Paraloid BTA 731.
[5] Fumed silica having a grafted silicone resin, available from Cabot Corp. under the trademark Cab-O-Sil TS 720.
[6] Amino silane surface-treated clay filler available from Englehard Corp. under the trademark Translink 445.

The catalyst polyol mixture is prepared by adding antimony pentafluoride dropwise with stirring to diethylene glycol (DEG), cooled to 5° C., under an inert atmosphere in a 3-neck flask. With the mixture at 25° C., N,N-diethyl-o-toluidine (DEoT) is added dropwise followed by addition of molten 1,4-cyclohexanedimethanol (CHDM), with stirring to yield the desired salt having about 4:1 mole ratio of amine to antimonic acid.

To prepare the adhesive, the epoxide is preheated to 120° C., the toughener is added, and the mixture is agitated under high shear for 1 hour at 120° C.. The premix is cooled to 22° C. and the catalyst-polyol mixture described above, fumed silica, and clay filler are added with mixing until a uniform composition is attained.

Samples are prepared as described above using electrocoated galvanized steel coupons and cured by heating in a forced air oven for 60 minutes at 121° C. Test results are reported in Table 2 below.

TABLE 2

|  | Ex. 1 | Ex. 2 | Ex. 3 | Ex. 4 | Ex. 5 |
|---|---|---|---|---|---|
| Lap Shear (MPa*) | | | | | |
| initial | 20.88 | 21.98 | 20.74 | 20.67 | 20.39 |
| after 24 hour boil | 19.29 | 19.29 | 18.95 | 17.78 | 19.09 |
| @ 82° C. | 12.06 | 8.27 | 11.78 | 12.40 | 12.06 |
| Pot Life @ 49° C. (days) | 6 | 8 | 8 | 7 | 7 |
| Reactivity (DSC, min) | 1.78 | 1.59 | 1.48 | 1.33 | 1.23 |
| Impact Strength @ −30° C. (J/m$^2$ × 10$^2$) | >114 | >114 | >114 | >114 | 105 |

*Megapascal

It is to be observed from Table 2 that compositions of the invention have excellent bond strength retention, rapid gel time, and desirable pot life of greater than 5 days at 49° C.

EXAMPLES 6-10

These examples illustrate the use of induction heating of the metal substrates to cure the compositions of the invention.

Examples 6-10 are prepared as in Examples 1-5 except as indicated using galvanized steel. The adhesive compositions are cured by inductive heating for 4 or 5 one second exposures with 3 seconds between each exposure. The samples are tested for initial lap shear strength at 22° C. as in Examples 1-5, the results being reported in Table 3.

TABLE 3

| Cure Time | Lap Shear Strength (MPa) | | | | |
|---|---|---|---|---|---|
| (Seconds) | Ex. 6 | Ex. 7 | Ex. 8 | Ex. 9 | Ex. 10 |
| 4.0 | 15.43 | 13.78 | 13.44 | 16.90 | 15.36 |
| 5.0 | 14.12 | 15.30 | 14.95 | 15.02 | 16.67 |

From the data, it can be seen that the adhesive compositions of the invention may be cured by inductive heating.

EXAMPLES 11-13

These examples illustrate compositions in which the molar ratio of substituted pentafluoroantimonic acid to aromatic amine is 1:5 and in which the epoxide is varied. Compositions are prepared and tested as in Examples 1-5 except as indicated on galvanized steel using the following formulation in Table 4.

TABLE 4

|  | Parts by Weight |
|---|---|
| Epoxide | 50.7 |
| Toughening agent | 7.5 |
| CHDM | 9.7 |
| Fumed silica | 3.0 |
| Clay filler | 25.0 |
| SbF$_5$ | 1.025 |
| Diethylene Glycol | 1.025 |
| DEoT | 3.88 |

Various epoxides used are shown in Table 5.

TABLE 5

|  | Ex. 11 | Ex. 12 | Ex. 13 |
|---|---|---|---|
| Epoxide | DEBA[1] | DEBA[2] | DEBF[3] |
| Lap Shear (MPa) | | | |
| initial | 21.57 | 20.95 | 21.08 |
| after 24 hour boil | 19.71 | 19.36 | 19.15 |
| @ 82° C. | 13.37 | 14.68 | 9.65 |
| Pot Life @ 49° C. (days) | 6 | 7 | 9 |
| Reactivity (DSC, min) | 1.68 | 1.62 | 1.80 |
| Impact Strength @ −30° C. (J/m$^2$ × 10$^2$) | >114 | >114 | >114 |

[1] Epoxide - uncured glycidyl ether of bisphenol A having an epoxy equivalent weight of about 190 and an average molecular weight of 350-400, available from Shell Chemical Company under the trademark Epon 828.
[2] Epoxide - virtually pure liquid bisphenol A/diglycidyl ether resin having an epoxy equivalent weight of 172-176, available from Dow Chemical Company under the trademark DER 332.
[3] Epoxide liquid undiluted epichlorohydrin-bisphenol F epoxy resin having an epoxide equivalent weight of 170-190 and a viscosity of 3,000-4,500 cps. at 23° C. using a Cannon-Fenske viscometer, reverse flow type, available from DIC Americas, Inc. under the trademark Epiclon 830.

The results in Table 5 show that different epoxides are usable in the compositions of the invention in that they have rapid gel times, pot life greater than 5 days, and excellent retention of lap shear strength on galvanized steel after water boil.

EXAMPLES 14-16

In these examples, various levels of a filler, aluminum powder, are used to prepare compositons of the invention.

The following formulation in Table 6 is used.

TABLE 6

| | Parts by Weight |
|---|---|
| DEBA[1] | 40.5 |
| DEBA[2] | 10.2 |
| Toughening agent[3] | 7.5 |
| Fumed silica | 3.0 |
| Clay filler | — |
| CHDM | 9.7 |
| SbF$_5$ | 1.025 |
| Diethylene glycol | 1.025 |
| DEoT | 3.88 |
| Aluminum Powder | — |

[1]Epoxide - uncured glycidyl ether of bisphenol A having an epoxy equivalent weight of about 190 and an average molecular weight of 350–400, available from Shell Chemical Company under the trademark Epon 828.
[2]Epoxide - virtually pure liquid bisphenol A/diglycidyl ether resin having an epoxy equivalent weight of 172–176, available from Dow Chemical Company under the trademark DER 332.
[3]Methyl methacrylate/butadiene/styrene copolymer available from Rohm and Haas Co. under the trademark Paraloid BTA 731.

Amounts of filler and aluminum are recorded in Table 7.

Compositions are prepared and tested as in Examples 1–5 except as indicated using a galvanized steel substrate with the aluminum powder being added after the clay filler. Mixing is continued until all materials are well-dispersed. Results are recorded in Table 7.

TABLE 7

| | Ex. 14 | Ex. 15 | Ex. 16 |
|---|---|---|---|
| Aluminum (parts) | 0.0 | 5.0 | 10.0 |
| Clay fillers (parts) | 25.0 | 20.0 | 15.0 |
| Lap Shear (MPa) | | | |
| initial | 21.57 | 21.57 | 21.77 |
| after 24 hour boil | 18.40 | 19.36 | 19.43 |
| @ 82° C. | 14.54 | 13.85 | 14.12 |
| Pot Life @ 49° C. (days) | 5.5 | 5 | 5 |
| Reactivity (DSC, min) | 1.49 | 1.18 | 1.30 |
| Impact Strength @ −56° C. (J/m$^2$ × 10$^2$) | 51 | 49 | 91 |

The results in Table 7 show that the use of aluminum powder in the invention produces compositions that have rapid gel times, pot life greater than 5 days and excellent retention of lap shear strength on galvanized steel after water boil.

EXAMPLES 17-19

In these examples, the epoxide is varied along with the amounts of polyol and filler.

Adhesive compositions are prepared and tested on galvanized steel as in Examples 14–16 except as indicated according to the formulation set forth in Table 8 below.

TABLE 8

| | Ex. 17 | Ex. 18 | Ex. 19 |
|---|---|---|---|
| DEBA[1] | 50.7 | | |
| DEBA[2] | | 50.7 | |
| DEBF[3] | | | 50.7 |
| Toughening agent[4] | 7.5 | 7.5 | 7.5 |
| CHDM | 9.6 | 10.13 | 10.44 |
| Fumed silica | 3.0 | 3.0 | 3.0 |
| Clay filler | 20.5 | 20.6 | 20.7 |
| Aluminum powder | 5.1 | 5.2 | 5.2 |
| SbF$_5$ | 1.025 | 1.025 | 1.025 |
| DEG | 1.025 | 1.025 | 1.025 |
| DEoT | 3.88 | 3.88 | 3.88 |
| Lap Strength (MPa) | | | |
| initial | 21.50 | 21.08 | 21.22 |
| after 24 hour boil | 19.98 | 19.95 | 19.77 |
| @ 82° C. | 15.23 | 11.02 | 8.34 |
| Pot Life @ 49° C. (days) | 7 | 7 | 10 |
| Reactivity (DSC, min) | 1.10 | 1.08 | 1.6 |
| Impact Strength @ −30° C. (J/m$^2$ × 10$^2$) | >114 | >114 | >114 |

[1]Epoxide - uncured glycidyl ether of bisphenol A having an epoxy equivalent weight of about 190 and an average molecular weight of 350–400, available from Shell Chemical Company under the trademark Epon 828.
[2]Epoxide - virtually pure liquid bisphenol A/diglycidyl ether resin having an epoxy equivalent weight of 172–176, available from Dow Chemical Company under the trademark DER 332.
[3]Epoxide liquid undiluted epichlorohydrin-bisphenol F epoxy resin having a epoxide equivalent weight of 170-190 and a viscosity of 3,000–4,500 cps. at 23° C. using a Cannon-Fenske viscometer, reverse flow type, available from DIC Americas, Inc. under the trademark Epiclon 830.
[4]Methyl methacrylate/butadiene/styrene copolymer available from Rohm and Haas Co. under the trademark Paraloid BTA 731.

The results of Table 8 illustrate that better pot life, impact strength, and retention of lap shear strength on galvanized steel are observed for the formulations of Examples 17–19, the variation in epoxide suggesting the greatest effect.

EXAMPLES 20-49

Compositions are prepared as in Examples 1–5 except as indicated using the following formulation in Table 9 with various polyols in the amounts shown in Table 10.

TABLE 9

| | Parts by Weight |
|---|---|
| DEBA[1] | 84.0 |
| Toughening agent | 16.0 |
| SbF$_5$ | 1.4 |
| DEG | 2.5 |
| DEoT | 2.2 |
| Polyol | — |

[1]Epoxide - uncured glycidyl ether of bisphenol A having an epoxy equivalent weight of about 190 and an average molecular weight of 350–400, available from Shell Chemical Company under the trademark Epon 828.

The toughening agent (Paraloid ™ BTA 731 from Rohm and Haas Co.) is predispersed in the epoxide in a high shear mixer at 150° C., and cooled to 22° C. To this dispersion are added a catalyst-polyol mixture prepared as in Examples 1–5. This mixture is mixed for 5 minutes until all materials are well dispersed.

Each composition is tested for lap shear strength at 22° C. and 82° C., and T-peel strength at 22° C. Samples are prepared using anodized aluminum coupons as described hereinabove, with oven curing at 121° C. for 60 minutes.

TABLE 10

| | | | Lap Shear Strength | | |
|---|---|---|---|---|---|
| Ex. | Polyol* | Parts | 22° C. (MPa) | 82° C. (MPa) | T-Peel (kN/m) |
| 20 | DEG | 7.5 | 37.20 | 21.36 | 4.6 |
| 21 | DEG | 9.5 | 37.20 | 13.09 | 6.7 |
| 22 | DEG | 11.5 | 37.20 | 10.34 | 8.4 |
| 23 | DEG | 13.5 | 37.20 | 5.51 | 10.7 |
| 24 | DEG | 15.5 | 37.20 | 3.45 | 9.5 |
| 25 | DEG | 17.5 | 36.52 | 2.76 | 8.1 |
| 26 | 1,4-BD | 6.4 | 35.83 | 23.43 | 4.9 |
| 27 | 1,4-BD | 8.1 | 34.45 | 15.85 | 6.7 |
| 28 | 1,4-BD | 9.8 | 36.52 | 14.47 | 9.1 |
| 29 | 1,4-BD | 11.5 | 37.20 | 11.71 | 10.0 |
| 30 | 1,4-BD | 13.2 | 37.90 | 6.20 | 10.9 |
| 31 | 1,4-BD | 16.6 | 37.20 | 2.76 | 10.0 |

TABLE 10-continued

| Ex. | Polyol* | Parts | Lap Shear Strength 22° C. (MPa) | 82° C. (MPa) | T-Peel (kN/m) |
|---|---|---|---|---|---|
| 32 | 1,6-HD | 8.4 | 36.52 | 16.54 | 7.5 |
| 33 | 1,6-HD | 10.6 | 37.20 | 14.47 | 8.2 |
| 34 | 1,6-HD | 12.8 | 35.14 | 9.65 | 10.2 |
| 35 | 1,6-HD | 15.1 | 33.76 | 7.58 | 8.6 |
| 36 | 1,6-HD | 17.3 | 35.14 | 10.34 | 9.1 |
| 37 | 1,6-HD | 19.5 | 35.14 | 8.27 | 10.0 |
| 38 | 2,2-DM-1,3-PD | 7.4 | 35.83 | 24.11 | 4.4 |
| 39 | 2,2-DM-1,3-PD | 9.3 | 40.65 | 19.29 | 6.1 |
| 40 | 2,2-DM-1,3-PD | 11.3 | 38.58 | 22.05 | 7.4 |
| 41 | 2,2-DM-1,3-PD | 13.0 | 39.96 | 13.09 | 9.5 |
| 42 | 2,2-DM-1,3-PD | 15.2 | 39.27 | 10.34 | 10.7 |
| 43 | 2,2-DM-1,3-PD | 17.2 | 36.52 | 8.96 | 8.8 |
| 44 | CHDM | 10.2 | 38.58 | 22.05 | 6.7 |
| 45 | CHDM | 12.9 | 39.96 | 22.05 | 7.5 |
| 46 | CHDM | 15.7 | 38.58 | 13.78 | 9.6 |
| 47 | CHDM | 18.4 | 38.58 | 11.71 | 11.4 |
| 48 | CHDM | 21.1 | 37.90 | 6.89 | 10.2 |
| 49 | CHDM | 23.8 | 37.90 | 5.51 | 11.4 |

*DEG = diethylene glycol; 1,4-BD = 1,4-butanediol
1,6-HD = 1,6-hexanediol; CHDM = cyclohexanedimethanol
2,2-DM-1,3-PD = 2,2-dimethyl-1,3-propanediol The results in Table 10 illustrate that the above polyols are useful in the composition of the invention in that they have excellent lap shear and T-peel strengths on anodized aluminum at 22° C.

EXAMPLES 50-53 AND COMPARATIVE EXAMPLES 1-2

In the following examples, compositions are prepared as in Examples 20-49 except as indicated using the formulation shown below in Table 11 with different toughening agents and polyols in the amounts shown in Table 12.

TABLE 11

|  | Parts by Weight |
|---|---|
| DEBA | 84.0 |
| Toughening agent | — |
| SbF$_5$ | 1.17 |
| DEG | 2.07 |
| DEoT | 1.76 |
| Polyol | — |

Comparative Example 2 uses no toughening agent and Comparative Example 1 uses a epoxide-reactive toughening agent.

Each composition is tested for lap shear strength at 22° C., T-peel strength at 22° C., and impact resistance at −30° C. on etched aluminum coupons, prepared by using FPL (Forest Products Laboratories) etch (immersion in a sulfuric acid/chromic acid bath) and oven cure of 121° C. for 60 minutes.

TABLE 12

|  | Ex. 50 | Ex. 51 | Ex. 52 | Ex. 53 | Comp 1 | Comp. 2 |
|---|---|---|---|---|---|---|
| CHDM | 16 |  |  |  | 16 | 16 |
| TMP (1) |  | 16 |  |  |  |  |
| DEG |  |  | 15 |  |  |  |
| 1,3-BD (2) |  |  |  | 14 |  |  |
| Toughening agent | 16 | 16 | 16 | 16 |  |  |
| Toughening agent (3) |  |  |  |  | 16 |  |
| Lap Shear (MPa) | 33.1 | 31.0 | 22.7 | 28.9 | * | 19.3 |
| T-Peel (kN/m) | 10.5 | 6.7 | 10.0 | 9.5 | * | 0.5 |
| Impact @ −30° C. | 66.5 | 38.0 | 58.9 | 93.1 | * | 57.0 |

TABLE 12-continued

|  | Ex. 50 | Ex. 51 | Ex. 52 | Ex. 53 | Comp 1 | Comp. 2 |
|---|---|---|---|---|---|---|
| (J/m$^2$ × 10$^2$) |  |  |  |  |  |  |

*Cannot determine; sample does not cure.
(1) TMP = trimethylolpropane
(2) 1,3-BD = 1,3-butanediol
(3) Telechelic butadiene copolymer available from BF Goodrich Company under the trademark Hycar CTBN having a Brookfield viscosity - RTV (mPa) of 410,000–730,000.

The results of Table 12 illustrate that the use of the toughening agents instantly claimed over the epoxide-reactive or no toughening agent at all results in improved lap shear and T-peel strengths with no loss of impact strength.

EXAMPLE 54

The adhesive composition is prepared using the following formulation in Table 13.

TABLE 13

|  | Parts by Weight |
|---|---|
| DEBA[1] | 48.7 |
| Toughening agent[2] | 9.3 |
| Fumed silica | 4.0 |
| CHDM | 9.4 |
| SbF$_5$ | 0.84 |
| DEG | 1.49 |
| DEoT | 1.27 |
| Aluminum Powder[3] | 25.0 |

[1] Epoxide - uncured glycidyl ether of bisphenol A having an epoxy equivalent weight of about 190 and an average molecular weight of 350–400, available from Shell Chemical Company under the trademark of Epon 828.
[2] Methyl methacrylate/butadiene/styrene copolymer available from Rohm and Haas Co. under the trademark Paraloid BTA 731.
[3] "Alcan MD201", available from Alcan Metal Powders.

The catalyst-polyol mixture is prepared by adding 0.84 grams antimony pentafluoride dropwise with stirring to 0.84 grams diethylene glycol (DEG), cooled to 5° C., under an inert atmosphere in a 3-neck flask. With the mixture at 25° C., 1.27 grams N,N-diethyl-o-toluidine (DEoT) and 0.65 grams diethylene glycol (DEG) are added with stirring followed by addition of the polyol (here molten CHDM).

To prepare the adhesive, the catalyst-polyol mixture described above is combined with remaining components in a small sigma blade mixer and mixed at room temperature, about 22° C., for about 45 minutes.

Samples are prepared and tested as in Examples 1-5 for lap shear strength initially (after cooling), after immersion in boiling water for 24 hours, and after 500 hours exposure to 5% salt spray. Test results are reported in Table 14.

TABLE 14

| Lap Shear (MPa) | Ex. 54 |
|---|---|
| initial | 17.78 |
| after 24 hour boil | 14.87 (84% retention) |
| after 500 hrs. salt spray | 15.65 (91% retention) |

The results in Table 14 show that the composition of the present invention has excellent retention of lap shear strength on galvanized steel after both water boil and salt spray exposures.

Various modifications and alterations of this invention will be apparent to those skilled in the art without departing from the scope of this invention.

What is claimed is:

1. A thermally-curable, one-part epoxy adhesive composition comprising:

(1) a glycidyl ether epoxide having an epoxy functionality greater than one and a molecular weight between about 150 and 10,000;

(2) a catalyst comprising (i) an acid of the formula $H^+SbF_5X^-$ wherein X is halogen, hydroxy, or —OR where —OR is the residue of an aliphatic or aromatic alcohol having a molecular weight less than about 10,000 and (ii) N,N-diethyl-o-toluidine;

(3) an aliphatic or non-aromatic cyclic polyol having about 2 to 18 carbon atoms, at least two hydroxy groups of which are primary or secondary, and being free of electron-withdrawing substituents, amine substituents, or large substituents that cause steric hindrance in the α-position in relation to the carbon attached to the methylol group of the polyol; and (4) a toughening agent that does not react with the epoxide during curing and has an epoxide compatible component and an epoxide incompatible component.

2. The composition of claim 1 wherein the polyol is present in an amount sufficient to provide an hydroxy to epoxy ratio between about 0.5:1 and 1.1:1.

3. The composition of claim 2 wherein said hydroxy to epoxy ratio is between about 0.7:1 and 0.8:1.

4. The composition of claim 1 wherein the molar ratio of said acid to N,N-diethyl-o-toluidine is between about 1:1.5 and 1:10.

5. The composition of claim 4 wherein said molar ratio is between about 1:2 and 1:6.

6. The composition of claim 1 wherein said toughening agent is present at between about 3% and 35% by weight of the epoxide.

7. The composition of claim 1 wherein said toughening agent is a polymeric compound having both a rubbery phase and a thermoplastic phase.

8. The composition of claim 7 wherein said toughening agent is a graft polymer having a polymerized, diene, rubbery core and a shell grafted thereto of an acrylic acid ester, a methacrylic acid ester, a monovinyl aromatic hydrocarbon, or a mixture thereof.

9. The composition of claim 8 wherein said rubbery core comprises polymerized butadiene or a polymerized mixture of butadiene and styrene.

10. The composition of claim 9 wherein said shell comprises a methacrylic acid ester.

11. The composition of claim 10 wherein said methacrylic acid ester comprises a lower alkyl substituted methacrylate.

12. The composition of claim 9 wherein said shell comprises a monovinyl aromatic hydrocarbon.

13. The composition of claim 12 wherein said hydrocarbon is selected from styrene, alpha-methylstyrene, vinyltoluene, vinylxylene, ethylvinylbenzene, isopropylstyrene, chlorostyrene, dichlorostyrene, and ethylchlorostyrene.

14. The composition of claim 7 wherein said toughening agent is a core-shell polymer wherein the core is a rubbery polyacrylate polymer having a glass transition temperature below about 0° C. and the shell is grafted thereto and is a thermoplastic polyacrylate polymer having a glass transition temperature above about 25° C.

15. The composition of claim 14 wherein said core is selected from polybutylacrylate and polyisooctylacrylate and said shell is polymethylmethacrylate.

16. The composition of claim 7 wherein said toughening agent is an elastomeric particle having a $T_g$ below about 25° C. that is a polymerized mixture of free-radical polymerizable monomers and a polymeric stabilizer that is soluble in the epoxide.

17. The composition of claim 1 wherein X is the residue of an alkylene glycol.

18. The composition of claim 1 wherein X is 2-(2-hydroxyethoxy)ethoxy.

19. The composition of claim 1 wherein said polyol is an alkylene glycol.

20. The composition of claim 1 wherein said polyol is 1,4-cyclohexanedimethanol.

21. The composition of claim 1 wherein said epoxide has a molecular weight between about 300 and 1,000.

22. The composition of claim 1 wherein said epoxide is a diglycidyl ether of bisphenol A or a diglycidyl ether of bisphenol F.

* * * * *

UNITED STATES PATENT AND TRADEMARK OFFICE
CERTIFICATE OF CORRECTION

PATENT NO. : 4,846,905

DATED : July 11, 1989

INVENTOR(S) : Kent S. Tarbutton & Janis Robins

It is certified that error appears in the above-identified patent and that said Letters Patent is hereby corrected as shown below:

On front page in [57] ABSTRACT "a048477475n" should be --an--.

On front page in [57] ABSTRACT "grater" should be --greater--.

On front page in [57] ABSTRACT "H+SbF$_5$X-" should be --H$^+$SbF$_5$X$^-$--.

Column 1, line 59, "H+SbF$_5$X-" should be --H$^+$SbF$_5$X$^-$--.

Column 3, line 27, "H+SbF$_5$X-" should be --H$^+$SbF$_5$X$^-$--.

Column 4, line 10, "in situ" should be underlined.

Column 4, line 48, "in situ" should be underlined.

Column 6, line 29, "20" should be --2--.

UNITED STATES PATENT AND TRADEMARK OFFICE
CERTIFICATE OF CORRECTION

PATENT NO. : 4,846,905

DATED : July 11, 1989

INVENTOR(S) : Kent S. Tarbutton & Janis Robins

It is certified that error appears in the above-identified patent and that said Letters Patent is hereby corrected as shown below:

Column 13, line 5, "$H+SbF_5X-$" should be -- $H^+SbF_5X^-$ --.

Signed and Sealed this

Twenty-second Day of May, 1990

Attest:

HARRY F. MANBECK, JR.

*Attesting Officer*   *Commissioner of Patents and Trademarks*